March 12, 1935.  C. C. HARBRIDGE  1,994,132
NUT
Filed May 12, 1934
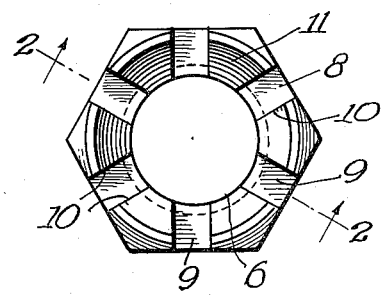
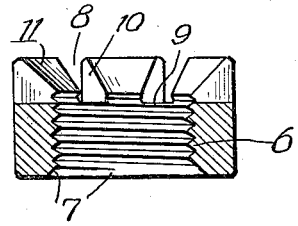
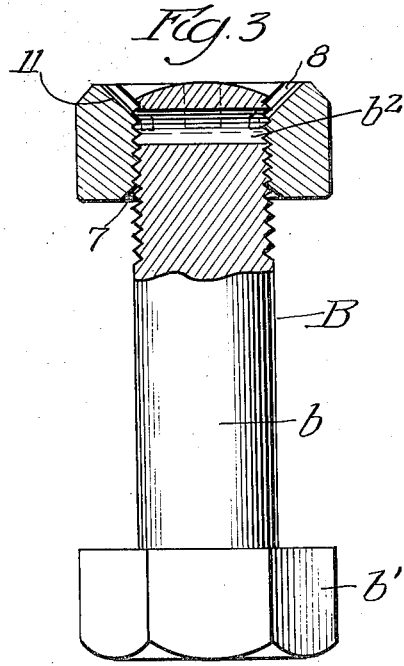
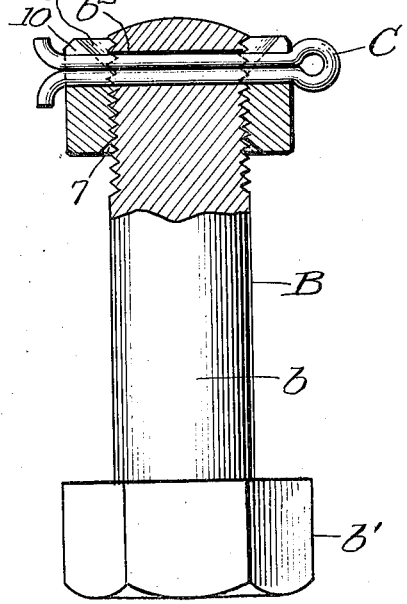
Inventor
Chester C. Harbridge
By Fred Gerlach
his Atty.

Patented Mar. 12, 1935

1,994,132

UNITED STATES PATENT OFFICE 1,994,132

NUT

Chester C. Harbridge, Detroit, Mich.

Application May 12, 1934, Serial No. 725,262

2 Claims. (Cl. 151—5)

The present invention relates generally to nuts for use on bolts having transverse, diametric holes in the extremities of the threaded ends thereof for cotter pins. More particularly the invention relates to that type of nut which has in its outer end pairs of radially extending, diametrically opposite, pin-receiving notches and is adapted to be turned or rotated on the threaded end of the cotter pin type bolt to which it is applied until it reaches a clamping position wherein two of the diametrically opposite notches thereof register with the hole in the bolt and permit the pin to be inserted through the hole and then bent into working relation with the nut.

The primary object of the invention is to provide a nut of this type which may be applied to a cotter pin type bolt more quickly and readily than previously designed nuts of the same general character by reason of the fact that the outer end thereof is chamfered around the internally threaded, longitudinally extending hole so that the inner portions of the parts of the nut between the notches slope gradually toward the internally threaded hole and thus during application of the nut to the bolt permit the person or individual applying the nut to locate or spot the transverse hole in the bolt before the nut is turned into its clamping position and when the notches are out of registry with the hole.

Another object of the invention is to provide a nut of the last mentioned character in which the chamfer is a straight sided one of approximately 45° and intersects the internally threaded, longitudinally extending hole in the nut slightly outwardly of the bottom walls of the notches so that the parts of the nut between the notches are of maximum thickness adjacent to said bottom walls and hence provide proper gripping surfaces or walls for the ends of the cotter pin.

A further object of the invention is to provide a nut of the notched, cotter pin receiving type which is generally of new and improved construction and may be produced at a low and reasonable cost.

Other objects of the invention and the various advantages and characteristics of the present nut construction will be apparent from a consideration of the following detailed description.

The invention consists in the several novel features which are hereinafter set forth and are more particularly defined by claims at the conclusion hereof.

In the drawing which accompanies and forms a part of this description or specification and in which like numerals of reference denote corresponding parts throughout the several views:

Figure 1 is a plan view of a nut embodying the invention;

Figure 2 is a longitudinal section on the line 2—2 of Figure 1;

Figure 3 is a detail sectional view showing the nut mounted on the theaded end of a cotter pin type bolt and disclosing the manner in which the chamfer around the outer end of the internally threaded, longitudinally extending hole serves to expose for spotting purposes the transverse hole in the bolt when the nut is turned but part way to its clamping position and none of the notches in the outer end of the nut is in registry or alignment with the hole in the bolt; and Figure 4 is another detail sectional view showing the nut after it has been turned or rotated into its clamping position on the bolt and a cotter pin has been inserted through the hole in the bolt and two of the notches in the nut to hold the nut against relative rotation with respect to the bolt.

The nut which forms the subject matter of the invention is formed of hexagonal metal stock and is designed primarily for use with a bolt B. This bolt as shown in Figures 3 and 4 of the drawing is of conventional construction and comprises an externally threaded shank $b$ and a hexagonal head $b^1$ at one end of the shank. Near the extremity of the other end of the shank a transverse diametric hole $b^2$ is formed. This hole is adapted as hereinafter described to receive a cotter pin C in order to lock the nut against rotation relatively to the bolt when it is mounted on the latter.

The nut has a centrally disposed, internally threaded hole 6 which extends longitudinally through the nut and permits the latter to be screwed on the externally threaded shank $b$ of the bolt B. By virtue of the fact that the nut is formed of hexagonal stock, the sides of the nut may be gripped by a wrench or similar turning tool in order to turn the nut on the bolt. The bottom or inner end of the nut is substantially flat and embodies an extremely small, 45° chamfer 7, which leads to the inner end of the internally threaded hole 6 and facilitates connection of the nut to the bolt. In order to accommodate the ends of the cotter pin C, the upper or outer end of the nut is provided with pairs of radially extending diametrically opposite notches 8. These notches are six in number and are positioned centrally with respect to the sides of the nut. They are approximately half again as deep as they are wide and extend from the sides of the nut to the internally threaded hole 6. When the nut is applied to the externally threaded shank of the bolt B it is adapted to be turned or rotated into what may be termed a clamping position, that is a position wherein it serves to clamp parts (not shown) on the shank between it and the head of the bolt B and two diametrically opposite notches 8 are aligned with the transverse hole $b^2$ in the shank of the bolt as shown in Figure 4. When the nut is in this position the cotter pin C may be inserted through the hole $b^2$ and the two notches in alignment with the hole and then secured in place by bending in opposite directions the split end parts of the cotter pin as well understood in the art. The notches 8 have flat bottom walls 9 and parallel side walls 10 and are so formed that when the nut is in its clamping position the bottom walls 10 are flush or co-planar with the inner portion of the transverse hole $b^2$ in the shank of the bolt.

When the nut is turned or rotated into its clamping position it is necessary in order to permit of insertion of the cotter pin C through the transverse hole $b^2$ in the outer extremity of the shank of the bolt to align two of the notches in the outer end of the nut with the hole $b^2$. In order to facilitate alignment or registry of two of the notches with the hole $b^2$, the outer end of the nut is provided with an internal, straight sided chamfer 11. This chamfer as shown in the drawing is one of an angle of 45° and leads to and intersects the internally threaded hole 6 in the nut. By employing the chamfer 11, the parts of the nut between the notches 8 slope gradually toward the hole 6 and thus the ends of the hole $b^2$ in the shank of the bolt are exposed when the nut is turned but partially into its clamping position and none of the notches 8 is aligned with the hole $b^2$ as shown in Figure 3. The chamfer 11 is of such depth that it intersects the internally threaded hole 6 slightly above the bottom walls 9 of the notches 8. Because of this, the portions of the side walls 10 of the notches that are adjacent to the bottom walls 9 are of maximum width, and hence provide proper abutment surfaces for the ends of the cotter pin C.

In applying the nut to the externally threaded shank of the bolt, the nut is first placed in the outer extremity of the shank and so that the chamfer 7 engages the outer extremity of the thread on the shank. The nut is then turned or rotated in order to screw it on the shank. As the nut approaches its clamping position the ends of the hole $b^2$ in the shank of the bolt are visible as the result of the chamfer 11 even though the hole $b^2$ is not aligned with any diametrically opposite pair of notches 8. Because of this the person or individual applying the nut may when the nut reaches its clamped position readily align two of the notches with the transverse hole $b^2$ so as to permit of insertion of the cotter pin C in the hole.

In fabricating the nut the chamfer 11 is formed either after or at the same time as the internally threaded hole 6 and the notches 8 are formed thereafter.

The herein described nut may be manufactured at an extremely low cost and may be applied more readily and quickly than previously designed nuts of the cotter pin type inasmuch as it exposes the cotter pin hole in the bolt before it is turned completely into clamping position, and regardless of whether any two diametrically opposite notches are in alignment with the hole in the shank of the bolt.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. As a new article of manufacture, a nut of the lock variety designed for use with a bolt embodying in the outer end of the threaded shank thereof a transverse hole for a cotter pin, and having an internally threaded, longitudinally extending hole for receiving the shank of the bolt and also having pairs of radially extending, diametrically opposite notches in the outer end thereof for receiving the ends of the cotter pin for nut locking purposes, said nut being adapted to be turned on the outer end of the bolt into a clamping position wherein two diametrically opposite notches are in registry with the ends of the transverse hole in the bolt shank for cotter pin insertion and embodying in the notched part thereof an internal chamfer leading to the outer end of the internally threaded hole whereby when the nut is but partially turned into its clamping position the ends of the cotter pin hole are visible regardless of whether any two notches are in alignment with said cotter pin hole, and it is possible in turning the nut into its clamping position readily to spot the ends of the cotter pin hole with respect to said notches.

2. As a new article of manufacture, a nut of the lock variety designed for use with a bolt embodying in the outer end of the threaded shank thereof a transverse hole for a cotter pin, and having an internally threaded, longitudinally extending hole for receiving the shank of the bolt and also having pairs of radially extending, diametrically opposite notches in the outer end thereof for receiving the ends of the cotter pin for nut locking purposes, said nut being adapted to be turned on the outer end of the bolt into a clamping position wherein two diametrically opposite notches are in registry with the ends of the transverse hole in the bolt shank for cotter pin insertion and embodying in the notched part thereof an internal chamfer leading to the outer end of the internally threaded hole at a point slightly above or outwardly of the bottom walls of the notches, whereby when the nut is but partially turned into its clamping position the ends of the cotter pin hole are visible regardless of whether any two notches are in alignment with said cotter pin hole and it is possible in turning the nut into its clamping position readily to spot the ends of the cotter pin hole with respect to said notches.

CHESTER C. HARBRIDGE.